Patented June 18, 1940

2,204,910

UNITED STATES PATENT OFFICE 2,204,910

REFRIGERATOR ODOR ABSORBENT

Alfred Arthur Randolph, San Francisco, Calif.

No Drawing. Application September 30, 1938,
Serial No. 232,616

4 Claims. (Cl. 252—2.5)

This invention relates to the removal of odors from ice and mechanical refrigerators, and particularly to a product which, placed in a refrigerator, will absorb the odors of the foods placed therein.

Among the objects of my invention are: To provide an odor absorbent which can be made of small dimensions so that it will not take up much of the valuable space therein; to provide an absorbent which is in block or brick form, and is consequently easy and convenient to handle; to provide an absorbent which is so effective as to permit pungent foods, such as fish, cheese, or onions, to be placed in a refrigerator without danger of contaminating such other foods as butter or milk; and to provide an absorbent which is self-purifying after use.

Other objects of my invention will be apparent or will be specifically pointed out in the description forming a part of this specification, but I do not limit myself to the embodiment of the invention herein described, as various forms may be adopted within the scope of the claims.

The basis of my deodorant or absorbent is an absorptive earth, preferably infusorial or diatomaceous earth. Of these two materials, diatomaceous earth is to be preferred, since it is lighter and more absorptive, but a satisfactory product can be made of infusorial earth.

With the earth there is a binder comprising uncooked starch, of which I have found the most satisfactory to be cornstarch. The exact proportions are not critical, but I have found a satisfactory amount to be three per cent by weight of dry starch to ninety-seven per cent of the earth. Sufficient water is added to the mixture to make a dough or thick paste, and the mass is then formed into bricks or blocks by means of molds.

The product is permitted to dry naturally in the air. Moderate heating by warm air will do no harm, but it is important that the material be not baked so as to cook the starch, since this greatly decreases its absorbent powers.

When the material has become sufficiently dry so that it may be removed from the mold and handled freely, it is ready for use. The molded block or brick is placed in the refrigerator, where it becomes active as soon as it is exposed to the cold and odor-laden air.

A characteristic of the material of my invention is that it reactivates itself when exposed to air of ordinary room temperatures. Removed from the refrigerator for a period of a day or two, it loses all of the odors which it has previously absorbed, and is ready to be used again.

It is obvious that a convenient way of maintaining a refrigerator clear of all odors is the use of two such blocks alternately, one of the blocks being reactivated by exposure to the air at room temperature while the other is in the refrigerator. In this way the refrigerator may always be maintained clean and fresh with a minimum of trouble. Upon occasion, however, I have found that a single block will keep a refrigerator or ordinary size sweet for a week or more without replacement, although it is obvious that a block so used will require a longer time for reactivation than one which has been absorbing odors for a shorter period.

I claim:

1. A deodorant block comprising an absorbent earth and a binder of uncooked starch.

2. A deodorant brick comprising diatomaceous earth and a binder of dried uncooked starch and water.

3. A deodorant block comprising infusorial earth and a binder of dried uncooked starch and water, the proportion of starch being approximately three per cent of the weight of the dry materials.

4. A deodorant block consisting solely of an air-dried uncooked molded mass of absorbent earth and starch in approximately the proportions ninety-seven per cent and three per cent, respectively.

ALFRED ARTHUR RANDOLPH.